United States Patent
Nemet et al.

(10) Patent No.: US 7,950,240 B2
(45) Date of Patent: May 31, 2011

(54) GAS TURBINE PLANT AND METHOD OF OPERATION

(75) Inventors: Anton Nemet, Nussbaumen (CH); Jürgen Hoffmann, Untersiggenthal (CH)

(73) Assignee: ALSTOM Technology Ltd., Baden (CH)

( * ) Notice: Subject to any disclaimer, the term of this patent is extended or adjusted under 35 U.S.C. 154(b) by 1105 days.

(21) Appl. No.: 11/689,002

(22) Filed: Mar. 21, 2007

(65) Prior Publication Data
US 2007/0227155 A1   Oct. 4, 2007

(30) Foreign Application Priority Data

Mar. 28, 2006  (CH) .................................... 0496/06
Aug. 11, 2006  (CH) .................................... 1296/06

(51) Int. Cl.
*F02C 3/30* (2006.01)
(52) U.S. Cl. ....... 60/775; 60/39.3; 60/39.53; 60/39.281; 60/39.27; 60/39.26; 60/744
(58) Field of Classification Search ............... 60/39.3, 60/775, 39.53, 39.281, 39.27, 39.26, 744
See application file for complete search history.

(56) References Cited

U.S. PATENT DOCUMENTS

| | | | | |
|---|---|---|---|---|
| 6,079,197 | A * | 6/2000 | Attia ................................ | 60/774 |
| 7,076,940 | B2 * | 7/2006 | Hirayama et al. ........... | 60/39.27 |
| 7,082,767 | B2 * | 8/2006 | Guillot-Salomon et al. ... | 60/773 |
| 2003/0014959 | A1 | 1/2003 | Ginter | |
| 2003/0192516 | A1 * | 10/2003 | Brunemann et al. ..... | 123/568.12 |
| 2004/0011050 | A1 | 1/2004 | Inoue | |
| 2004/0076218 | A1 | 4/2004 | Tomlinson et al. | |
| 2007/0119178 | A1 * | 5/2007 | Berenbrink et al. ............ | 60/773 |

FOREIGN PATENT DOCUMENTS

| | | |
|---|---|---|
| DE | 19548739 | 6/1997 |
| DE | 10322703 | 12/2003 |
| DE | 102005011287 | 11/2005 |
| EP | 0620362 | 10/1994 |
| EP | 0765998 | 4/1997 |
| EP | 0995891 | 4/2000 |

(Continued)

OTHER PUBLICATIONS

Search Report for Swiss Patent App. No. 1296/2006 (Dec. 16, 2006).

(Continued)

*Primary Examiner* — Michael Cuff
*Assistant Examiner* — Craig Kim
(74) *Attorney, Agent, or Firm* — Cermak Nakajima LLP; Adam J. Cermak

(57) ABSTRACT

In a method for operating a gas turbine plant (10) with a compressor (11) for the compression of combustion air sucked in from the surroundings, with a combustion chamber (15) for generating hot gas by the combustion of a fuel with compressed combustion air, and with a turbine (12), in which the hot gas from the combustion chamber (15) is expanded so as to perform work, temperatures and pressures are measured at various points in the gas turbine plant (10), and a combustion chamber exit temperature is derived from the measured temperatures and pressures and used for controlling the gas turbine plant (10). Improved temperature determination is achieved in that the composition of the gas, in particular the water content in the exhaust gas of the turbine (12), is determined, and in that the specific water content in the exhaust gas of the turbine (12) is taken into account in deriving the combustion chamber exit temperature.

20 Claims, 3 Drawing Sheets

FOREIGN PATENT DOCUMENTS

| | | |
|---|---|---|
| EP | 1231369 | 8/2002 |
| EP | 1531243 | 5/2005 |
| WO | WO03/027460 | 4/2003 |
| WO | WO2004085816 | 10/2004 |

OTHER PUBLICATIONS

Search Report for European Patent App. No. 07103472.2 (Aug. 2, 2007).

* cited by examiner

GAS TURBINE PLANT AND METHOD OF OPERATION

This application claims priority under 35 U.S.C. §119 to Swiss application nos. 00496/06, filed 28 Mar. 2006, and 01296/06, filed 11 Aug. 2006, the entireties of which are incorporated by reference herein.

BACKGROUND

1. Field of Endeavor

The present invention relates to the field of gas turbines. It refers to a method of operating a gas turbine plant and to a gas turbine plant useful for carrying out the method.

2. Brief Description of the Related Art

A gas turbine plant 10, such as is reproduced by way of example in FIG. 1, includes a compressor 11 for the compression of combustion air sucked in from the surroundings via a compressor inlet 18, a combustion chamber 15, in which fuel supplied via a fuel supply 20 is burnt by means of the compressed combustion air, and a following turbine 12, in which the hot gas coming from the combustion chamber 15 is expanded so as to perform work. The turbine 12, via a shaft 14, drives the compressor 11 and a generator 13 which generates electrical power and discharges it via a transformer 16 to a network (not illustrated).

Such a gas turbine plant 10 is operated at very high temperatures in order to achieve good efficiency. There have hitherto been no suitable measuring instruments for the temperatures occurring at the exit of the combustion chamber 15 and at the turbine inlet 21. These temperatures are nevertheless important for regulating the gas turbine plant. For a long time, therefore, other parameters of the gas turbine plant, such as, for example, the exhaust gas temperature downstream of the turbine, the temperature at the compressor outlet and various pressures or pressure conditions, which can be measured reliably, have been measured, and, for example, the temperature at the exit of the combustion chamber is determined indirectly from these parameters (see, for example, EP-A2-1 231 369).

It became apparent, in this context, that the composition of the gas, in particular the water content, in the working medium flowing through the gas turbine has to be taken into account in determining the combustion chamber exit temperature. If a specific fixed gas composition is assumed, the algorithm used for determining the temperature can be designed accordingly. Problems arise, however, when the composition of the gas, in particular the water content, deviates considerably during the operation for which the algorithm for temperature determination is designed. Whereas the natural fluctuations in the atmospheric humidity of the sucked-in ambient air are comparatively low and therefore cause fewer problems, for example, the introduction of water into the intake tract gives rise to considerable deviations in the water content within the framework of the power-increasing methods designated as high fogging or wet compression.

In this case, it is found that the gas composition is highly dependent on the composition of the fuel or of the fuel quantity, particularly in the combustion of lean gases (synthesis gas, industrial gases, integrated coal gasification).

It has therefore already been proposed, in the patent application initially mentioned, to measure the supply of water on the intake side of the compressor and to take these values into account in determining the combustion chamber exit temperature. In a parallel patent application (US-A1-2004/0076218, now U.S. Pat. No. 6,805,483), at least the title refers to the fact that the water content of the fuel may also be taken into account with a correcting effect in the determination of the combustion chamber exit temperature.

By determining the water taken up together with the intake air and/or with the fuel into the working medium, some effects can be taken into account in temperature determination. There are, however, further types of operation of gas turbine plants which may have effects on temperature determination in terms of the water content in the working medium. What is critical in this case is the steam content in the exhaust gas of the turbine. If this content deviates considerably from the value on which the algorithm for temperature determination has been based, the operating point and the temperature drop across the turbine are displaced according to the known relation for isentropic expansion $$\frac{T6}{T7} = \left(\frac{p6}{p7}\right)^{\frac{K-1}{K}}$$

with the temperature T6 and the pressure p6 at the turbine inlet (measurement point M6 in FIG. 1), with the temperature T7 and the pressure p7 at the turbine outlet (measurement point M7 in FIG. 1) and with the ratio "κ" of the specific heats.

Typical examples of modes of operation of the gas turbine plant with the injection of water or steam are as follows:
power increase
  injection of water or steam into the combustion chamber;
  injection of water or steam into the cooling air system (see, for example the publication EP-A2-0 995 891);
exhaust gas check (NOx, etc.)
  injection of water or steam into the combustion chamber;
for gas turbine plants with quencher
  injection of water into the low-pressure and high-pressure cooling air coolers and consequently into the cooling air system;
intake air cooling
  evaporation cooler;
  fogging;
  high fogging;
water content as combustion product.

SUMMARY

One aspect of the present invention includes a method of operating a gas turbine plant which avoids disadvantages of the known methods and is distinguished particularly in that the composition of the gas, in particular the influence of the water content on temperature determination, is, in general, taken into account in the regulation of the gas turbine plant, and a gas turbine plant useful for carrying out the method.

In exemplary methods embodying principles of the present invention, the composition of the gas, in particular the water content in the exhaust gas of the turbine, is determined, and the determined water content in the exhaust gas of the turbine is taken into account in deriving the combustion chamber exit temperature. Exemplary gas turbine plants embodying principles of the present invention are distinguished in that second means for determining the composition of the gas, in particular the water content in the exhaust gas of the turbine, are provided, which are connected to the control.

In a preferred refinement, the temperatures at the compressor inlet and at the turbine outlet are measured, the pressure at the turbine outlet and at least one of the pressures at the compressor outlet, at the entrance of the combustion chamber, at the exit of the combustion chamber, or at the turbine inlet are measured, and the measured temperatures at the compressor inlet and at the turbine outlet and the ratio of one of the measured pressures at the compressor outlet, at the entrance of the combustion chamber, at the exit of the combustion chamber, or at the turbine inlet to the measured pressure at the turbine outlet are used to derive the combustion chamber exit temperature.

In particular, the composition of the exhaust gas of the turbine can be measured in order to determine the water content. If means for monitoring the NOx content in the exhaust gas of the turbine are present, the monitoring means may advantageously be used for measuring the composition of the exhaust gas of the turbine.

However, the water content in the exhaust gas of the turbine may also be determined approximately from the composition of the fuel and from the size of the fuel mass flow, either the fuel mass flow being measured directly or the fuel mass flow being regulated by a regulating valve, the position of the regulating valve being monitored, and the fuel mass flow being calculated from the position of the regulating valve, or the initial power of the gas turbine plant or a comparable parameter being measured, and the fuel mass flow being calculated from the measured initial power or the comparable parameter.

It is also conceivable, however, that the water content of all the mass flows flowing into the working medium of the gas turbine is determined, and that the water content present in the exhaust gas of the turbine is derived from this.

A refinement of the gas turbine plant according to the invention is distinguished in that the first means comprise measurement points for measuring the temperature at the compressor inlet and the temperature and pressure at the turbine outlet, and also at least one measurement point for measuring one of the pressures at the compressor outlet, at the entrance of the combustion chamber, at the exit of the combustion chamber or at the turbine inlet.

The second means preferably includes an analysis device for analyzing the exhaust gas of the turbine or means for determining the fuel mass flow.

In particular, the means for determining the fuel mass flow may include a throughflow measurement device arranged in the fuel supply. It is also conceivable, however, that a regulating valve is arranged in the fuel supply, and that the means for determining the fuel mass flow includes a device for detecting the position of the regulating valve.

It is likewise conceivable that the turbine drives a generator for generating electrical power, and that the means for determining the fuel mass flow includes a power measurement device at the terminals of the generator.

However, the second means may also include water measurement devices at the points in the gas turbine plant at which a supply of water into the working medium of the gas turbine plant takes place.

The same applies similarly to both turbines in the event of sequential combustion. Such a plant may be gathered from EP-B1-0 620 362, this entire publication forming an integral part of this application.

BRIEF DESCRIPTION OF THE DRAWINGS

The invention will be explained in more detail below by means of exemplary embodiments in conjunction with the drawing in which.

DETAILED DESCRIPTION OF EXEMPLARY EMBODIMENTS

Figure 1:
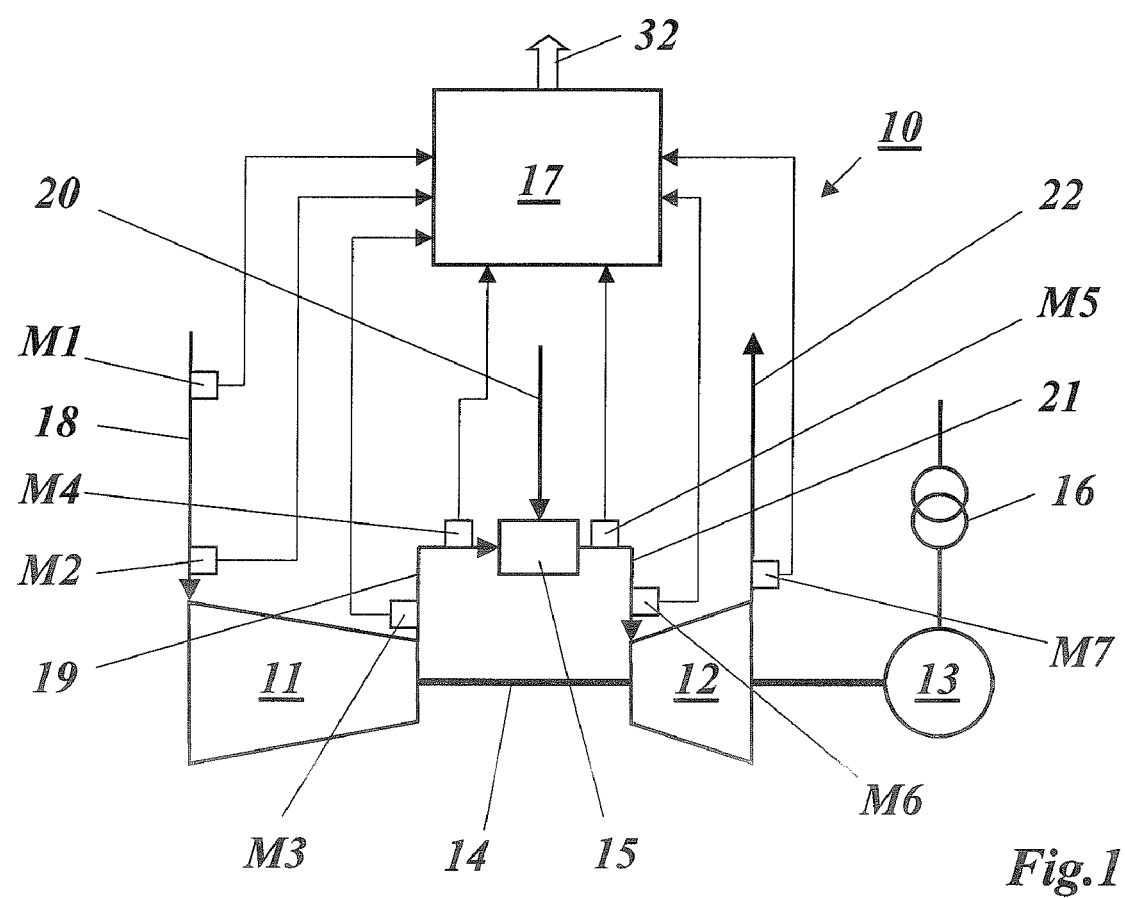
FIG. 1 shows a greatly simplified diagram of an exemplary gas turbine plant with control and with various measurement points for recording the gas turbine parameters suitable for control.

FIG. 1 shows a greatly simplified diagram of an exemplary gas turbine plant with control and with various measurement points for recording the gas turbine parameters suitable for control. The gas turbine plant 10, which, as already described further above, includes a compressor 11, a combustion chamber 15, a turbine 12 and a generator 13 and also a control 17, has a plurality of measurement points M1, . . . , M7, at which temperatures and/or pressures can be measured for controlling the gas turbine. At the measurement point M1 at the entrance of the compressor inlet 18, via which the ambient air is sucked in, the temperature T1 of the ambient air can be measured, and, at the measurement point M2, the temperature T2 directly at the entrance of the compressor 11. At the measurement point M3, the temperature T3 and pressure p3 at the compressor outlet 19 can be measured, at the measurement point M4 the pressure p4 at the entrance of the combustion chamber 15, at the measurement point M5 the pressure p5 at the exit of the combustion chamber, at the measurement point M6 the pressure p6 at the turbine inlet 21, and at the measurement point M7 the temperature T7 and pressure p7 at the turbine outlet 22.

The parameters recorded at the measurement points M1, . . . , M7 are input into the control and are used in the determination of the (unmeasureable) temperature at the exit of the combustion chamber 15 or at the entrance of the turbine. In particular, the temperatures T2 and T7 are used, and also a pressure ratio px/p7, in which x may be 3, 4, 5, or 6. At the controller output 32, the control emits control signals for regulating valves or regulating flaps within the gas turbine plant 10, by means of which the temperature at the exit of the combustion chamber 15 can be set or held at the desired value.

According to principles of the present invention, what is taken into account in determining the temperature at the exit of the combustion chamber 15 is, in general, the composition of the gas, in particular the water content in the exhaust gas of the turbine 12, which includes the sum of all the water mass flows which enter the working medium and influence indirect temperature determination.

Figure 2:
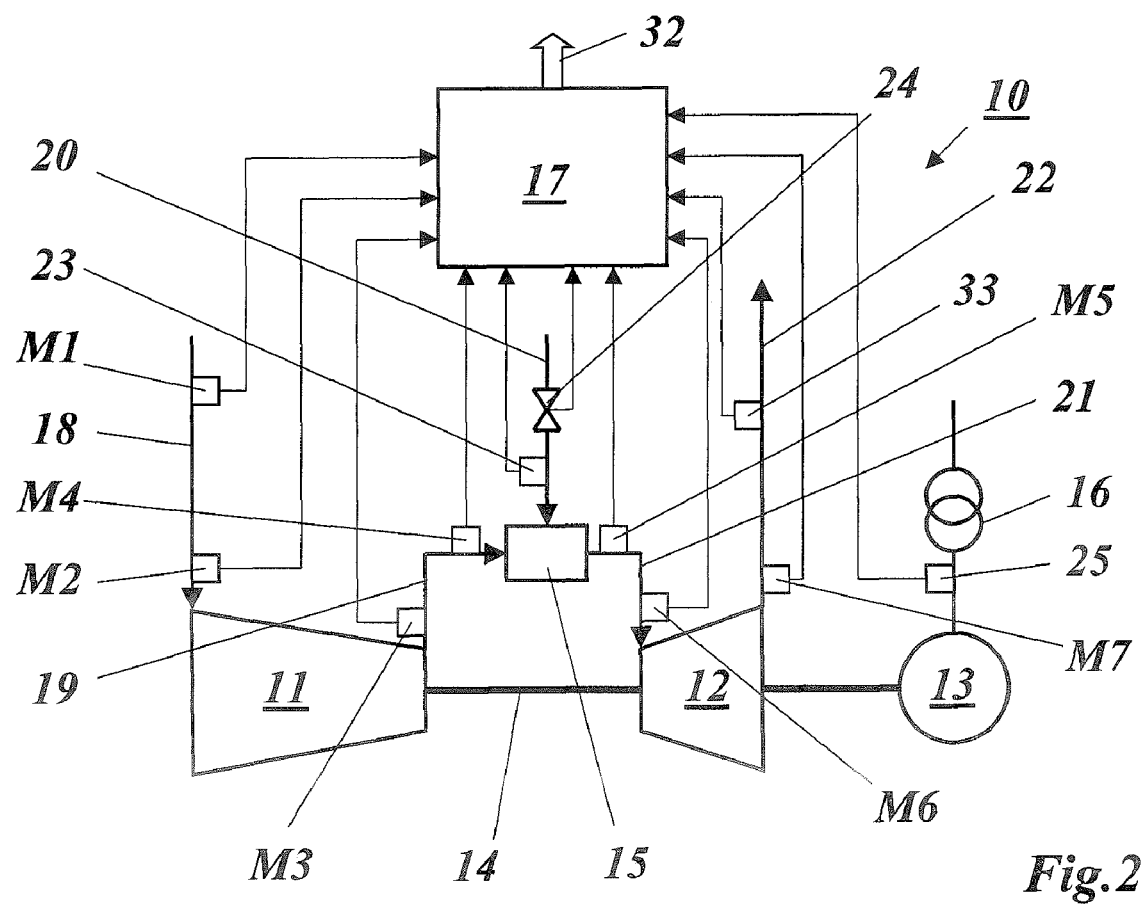
FIG. 2 shows an illustration, comparable to FIG. 1, of a gas turbine plant according to an exemplary embodiment of the present invention, in which the water content in the exhaust gas can be determined for control from an analysis of the exhaust gas composition or from the fuel composition and from the fuel mass flow.

According to FIG. 2, for this purpose, an analysis device 33 arranged downstream of the turbine 12 in the exhaust gas stream may be employed, by which the composition of the exhaust gas in terms of NOx is already determined. The analysis yields the water content in the exhaust gas, the value of which can be input into the control 17 and used there for correction in temperature determination.

Alternative to this, the water content in the exhaust gas of the turbine 12 may be determined approximately from the (known) composition of the fuel and from the size of the fuel mass flow. According to FIG. 2, the fuel mass flow can be measured directly by means of a throughflow measurement device 23 arranged in the fuel supply 20. It is also conceivable, however, that, if the fuel mass flow is regulated by a regulating valve 24 in the fuel supply 20, the position of the regulating valve 24 is monitored and the fuel mass flow is calculated from the position of the regulating valve 24. It is likewise conceivable, for example by use of a power measurement device 25 connected to the terminals of the generator 13, to measure the initial power of the gas turbine plant 10 or a comparable parameter and then calculate the fuel mass flow from the measured initial power or the comparable parameter.

Another possibility for determining the water content of the exhaust gas is that the water content of all the mass flows flowing into the working medium of the gas turbine plant 10 is determined and the water content present in the exhaust gas of the turbine 12 is derived from this. Water may in this case be supplied:
- by the air on the intake side of the compressor 11;
- by an evaporation cooler or the like;
- by a fogging or high fogging system;
- by injection into the combustion chamber or the cooling system for power increase or for exhaust gas check;
- by the fuel itself.

Water may, however, also be extracted, specifically by a cooling system and/or by a water discharge, for example drop separators in the cooling air system in the case of high fogging operation.

Figure 3:
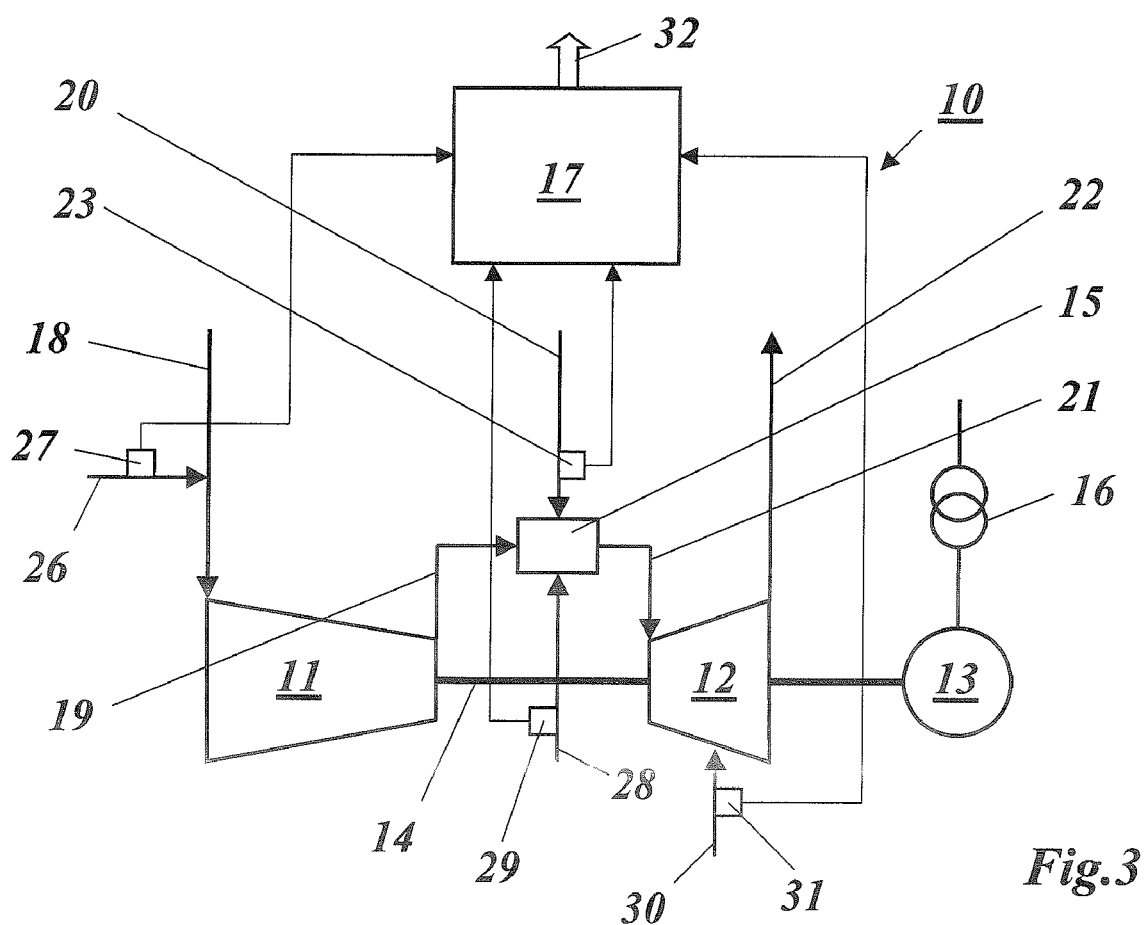
FIG. 3 shows an illustration, comparable to FIG. 1, of a gas turbine plant according to another exemplary embodiment of the present invention, in which the water content in the exhaust gas can be determined for control by means of measurements of all the mass flows introducing water into the working medium.

In FIG. 3, for example, three water-supplying mass flows are depicted, to be precise the water supply 26 in the intake region of the compressor 11, the water supply 28 into the combustion chamber and the water supply 30 for cooling the turbine 12. In any event, water measurement devices 26, 29, and 31 are provided, the measurement values of which are input into the control 17.

Overall, principles of the present invention afford a generalized operating method, in which the exhaust gas composition, particularly in terms of the water content, is determined, and therefore all the water additions occurring under the various operating conditions and important for temperature determination are detected. It thereby becomes possible to have a more accurate determination of the temperature of the exit of the combustion chamber and consequently an improved control of the gas turbine plant. The same applies similarly to both turbines in the event of sequential combustion, optionally in which both combustion chambers have an annular configuration, and the second combustion chamber is configured and arranged to operate as an autoignition combustion chamber.

LIST OF REFERENCE SYMBOLS

| | |
|---|---|
| 10 | Gas turbine plant |
| 11 | Compressor |
| 12 | Turbine |
| 13 | Generator |
| 14 | Shaft |
| 15 | Combustion chamber |
| 16 | Transformer |
| 17 | Control |
| 18 | Compressor inlet |
| 19 | Compressor outlet |
| 20 | Fuel supply |
| 21 | Turbine inlet |
| 22 | Turbine outlet |
| 23 | Throughflow measurement device |

-continued

LIST OF REFERENCE SYMBOLS

| | |
|---|---|
| 24 | Regulating valve |
| 25 | Power measurement device |
| 26, 28, 30 | Water supply |
| 27, 29, 31 | Water measurement device |
| 32 | Controller output |
| 33 | Analysis device |
| M1, ..., M7 | Measurement point |

While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A method for operating a gas turbine plant having a compressor for the compression of combustion air sucked in from the surroundings, a combustion chamber for generating hot gas by the combustion of a fuel with the compressed combustion air, and a turbine, the method comprising:
   expanding the hot gas from the combustion chamber to perform work;
   measuring temperatures and pressures at various points in the gas turbine plant;
   determining the composition of the exhaust gas of the turbine;
   deriving a combustion chamber exit temperature from the measured temperatures and pressures and from the determined composition of the exhaust gas of the turbine; and
   controlling the gas turbine plant based in part on the derived combustion chamber exit temperature.

2. The method as claimed in claim 1, wherein measuring temperatures comprises measuring temperatures at the compressor inlet and at the turbine outlet;
   wherein measuring pressures comprises measuring the pressure at the turbine outlet and at least one of the pressures at the compressor outlet, at the entrance of the combustion chamber, at the exit of the combustion chamber, or at the turbine inlet; and
   wherein deriving comprises deriving from measured temperatures at the compressor inlet and at the turbine outlet and the ratio of one of the measured pressures at the compressor outlet, at the entrance of the combustion chamber, at the exit of the combustion chamber, or at the turbine inlet to the measured pressure at the turbine outlet.

3. The method as claimed in claim 1, wherein determining the composition of the exhaust gas of the turbine comprises determining the water content of the exhaust gas.

4. The method as claimed in claim 3, wherein the gas turbine plant further includes means for monitoring the NOx content in the exhaust gas of the turbine, and wherein determining comprises determining the composition of the exhaust gas of the turbine with the monitoring means.

5. The method as claimed in claim 3, wherein determining the water content in the exhaust gas of the turbine comprises approximately determining the water content from the composition of the fuel and from the size of the fuel mass flow.

6. The method as claimed in claim 5, comprising directly measuring the fuel mass flow.

7. The method as claimed in claim 5, further comprising:
regulating the fuel mass flow with a regulating valve;
monitoring the position of the regulating valve; and
calculating the fuel mass flow from the position of the regulating valve.

8. The method as claimed in claim 5, further comprising:
measuring the initial power of the gas turbine plant; and
calculating the fuel mass flow from the measured initial power.

9. The method as claimed in claim 3, further comprising:
determining the water content of all the mass flows flowing into the working medium of the gas turbine plant; and
wherein determining the water content of the exhaust gas of the turbine comprises determining based on the determined water content of all the mass flows flowing into the working medium of the gas turbine plant.

10. A gas turbine plant comprising:
a compressor configured and arranged to compress combustion air sucked in from the surroundings;
a combustion chamber in communication with the compressor, configured and arranged to generate hot gas by the combustion of a fuel with the compressed combustion air;
a turbine in communication with the combustion chamber, configured and arranged to expand hot gas from the combustion chamber to perform work;
first means for the measurement of temperatures and pressures at points in the gas turbine plant;
second means for determining the water content in the exhaust gas of the turbine; and
a control connected to the first means and to the second means, the control configured and arranged to derive a combustion chamber exit temperature from the measured temperatures and pressures and water content of the exhaust gas, and to control the gas turbine plant based in part on the derived combustion chamber exit temperature.

11. The gas turbine plant as claimed in claim 10, wherein the compressor includes an inlet and an outlet, the turbine includes an inlet and an outlet, the combustion chamber includes an entrance and an exit, wherein the first means comprises measurement points positioned for measuring the temperature at the compressor inlet and the temperature and pressure at the turbine outlet, and at least one measurement point positioned for measuring one of the pressures at the compressor outlet, at the entrance of the combustion chamber, at the exit of the combustion chamber, or at the turbine inlet.

12. The gas turbine plant as claimed in claim 10, wherein the second means comprises an analysis device configured and arranged to analyze the exhaust gas of the turbine.

13. The gas turbine plant as claimed in claim 10, wherein the second means comprises means for determining the fuel mass flow.

14. The gas turbine plant as claimed in claim 13, wherein the means for determining the fuel mass flow comprises a throughflow measurement device arranged in the fuel supply.

15. The gas turbine plant as claimed in claim 13, further comprising:
a regulating valve arranged in the fuel supply; and
wherein the means for determining the fuel mass flow comprises a device configured and arranged to detect the position of the regulating valve.

16. The gas turbine plant as claimed in claim 13, further comprising:
a generator having terminals, the turbine configure to drive the generator for generating electrical power; and
wherein the means for determining the fuel mass flow comprises a power measurement device at the generator terminals.

17. The gas turbine plant as claimed in claim 10, further comprising:
points in the gas turbine plant at which a supply of water into the working medium of the gas turbine, discharge of water, or both, can be made; and
wherein the second means comprises water measurement devices at the points.

18. The gas turbine plant as claimed in claim 13, wherein the second means further comprises means for determining the fuel composition and the influence of the fuel composition on the exhaust gas composition.

19. The gas turbine plant according to Claim 10:
wherein said combustion chamber is a first combustion chamber downstream of the compressor;
wherein said turbine is a first turbine downstream of the first combustion chamber;
further comprising a second combustion chamber downstream of the first turbine; and
further comprising a second turbine downstream of the second combustion chamber;
wherein the first combustion chamber and the second combustion chamber each have an annular configuration; and
wherein the second combustion chamber is configured and arranged to operate as an autoignition combustion chamber.

20. The method as claimed in claim 3, wherein determining the water content of the exhaust gas comprises measuring the water content of the exhaust gas.

* * * * *